(12) United States Patent
Huang et al.

(10) Patent No.: US 8,045,306 B2
(45) Date of Patent: Oct. 25, 2011

(54) ELECTRICAL-OVERSTRESS PROTECTION CIRCUIT FOR AN INTEGRATED CIRCUIT

(75) Inventors: Chung-Ming Huang, Tainan (TW); Tieh-Yen Chang, Tainan (TW); Hung-Sui Lin, Tainan (TW)

(73) Assignee: Himax Technologies Limited, Tainan County (TW)

( * ) Notice: Subject to any disclaimer, the term of this patent is extended or adjusted under 35 U.S.C. 154(b) by 0 days.

(21) Appl. No.: 12/710,535

(22) Filed: Feb. 23, 2010

(65) Prior Publication Data

US 2011/0090608 A1    Apr. 21, 2011

Related U.S. Application Data

(60) Provisional application No. 61/252,618, filed on Oct. 16, 2009.

(51) Int. Cl.
*H02H 9/00*    (2006.01)

(52) U.S. Cl. ......................................................... 361/56

(58) Field of Classification Search ...................... 361/56
See application file for complete search history.

(56) References Cited

U.S. PATENT DOCUMENTS

| | | | | |
|---|---|---|---|---|
| 4,605,980 | A | * | 8/1986 | Hartranft et al. ................. 361/56 |
| 5,877,534 | A | * | 3/1999 | Williams et al. ............... 257/355 |
| 2003/0076639 | A1 | * | 4/2003 | Chen .............................. 361/56 |
| 2004/0109270 | A1 | * | 6/2004 | Stockinger et al. ............. 361/56 |

* cited by examiner

*Primary Examiner* — Rexford Barnie
*Assistant Examiner* — Ann Hoang
(74) *Attorney, Agent, or Firm* — Stout, Uxa, Buyan & Mullins, LLP

(57) ABSTRACT

An electrical-overstress (EOS) protection circuit for an electronic device includes series-connected resistors, a mode-control switch, and a bias circuit. The series-connected resistors are electrically coupled between an input and an output, and the mode-control switch is electrically coupled between the output and a ground. The bias circuit is electrically coupled to the input for generating a mode-control signal to control the mode-control switch. The bias circuit generates the mode-control signal in a way such that the mode-control switch is open in a normal mode and closed in an EOS mode.

7 Claims, 3 Drawing Sheets

ELECTRICAL-OVERSTRESS PROTECTION CIRCUIT FOR AN INTEGRATED CIRCUIT

CROSS-REFERENCE TO RELATED APPLICATIONS

The present application claims the benefit of U.S. Provisional Application No. 61/252,618 filed on Oct. 16, 2009, the complete subject matter of which is incorporated herein by reference in its entirety.

BACKGROUND OF THE INVENTION

1. Field of the Invention

The present invention generally relates to a protection circuit, and more particularly to an electrical-overstress (EOS) protection circuit for an electronic device such as an integrated circuit.

2. Description of Related Art

Electronic devices such as semiconductor integrated circuits (ICs) are typically designed to operate at specified voltages or voltage ranges. The electronic devices may fail or even be damaged when the input voltage exceeds the specified voltages or voltage ranges. Such abnormal and harmful input is commonly known as electrical overstress (EOS).

As the incidence of an EOS, which may take the form of for example an electrical spike, is usually unavoidable in common electronic applications, there is a need to provide a protection circuit in the electronic device to prevent the EOS from driving the electronic device to failure or damage.

SUMMARY OF THE INVENTION

In view of the foregoing, it is an object of the embodiment of the present invention to provide an electrical-overstress (EOS) protection circuit for an electronic device in order to protect the electronic device from failure and damage.

According to one embodiment, series-connected resistors are electrically coupled between an input and an output, and a mode-control switch is electrically coupled between the output and a ground. A bias circuit is electrically coupled to the input for generating a mode-control signal to control the mode-control switch. The bias circuit generates the mode-control signal in a way such that the mode-control switch is open in a normal mode and closed in an EOS mode.

According to another embodiment, series-connected voltage-controlled resistors are electrically coupled between an input and an output, and a mode-control switch is electrically coupled between the output and a ground. A bias circuit is electrically coupled to the input for generating a mode-control signal to control the mode-control switch and also generating at least one control signal for controlling at least one of the voltage-controlled resistors. The bias circuit generates the mode-control signal and the control signal in a way such that the mode-control switch is open in a normal mode and closed in an EOS mode, and resistance of the voltage-controlled resistor is higher in the EOS mode than in the normal mode.

DETAILED DESCRIPTION OF THE INVENTION

Figure 1A:
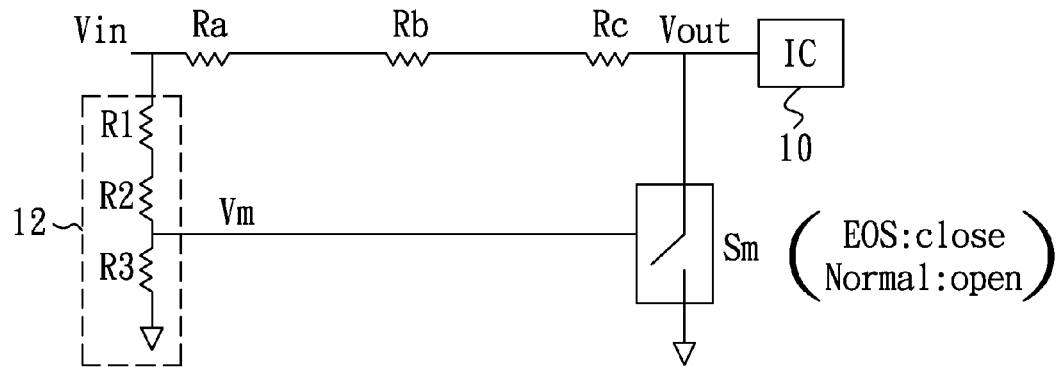
FIG. 1A shows a schematic of an electrical-overstress (EOS) protection circuit for an electronic device according to a first embodiment of the present invention.

FIG. 1A shows a schematic of an electrical-overstress (EOS) protection circuit for an electronic device such as that taking the form of an integrated circuit (IC) 10 according to a first embodiment of the present invention. Although a 3.3 volt (V) IC is illustrated, it is appreciated by those skilled in the art that the embodiment may be generalized to other ICs that operate at a voltage other than 3.3V.

The EOS protection circuit is configured ahead of the IC 10 under protection in order to prevent the IC 10 from being damaged. In the embodiment, the EOS protection circuit primarily includes resistors Ra-Rc connected in series, a bias circuit 12, and a mode-control switch Sm. Specifically, the series-connected resistors Ra-Rc are electrically coupled between the input Vin of the EOS protection circuit and the output Vout of the EOS protection circuit. Electrical coupling of the bias circuit 12 to the input Vin generates a mode-control signal Vm to control the mode-control switch Sm, which is electrically coupled between the output Vout and the ground (or Vss). In one exemplary embodiment, the bias circuit 12 includes a voltage divider that partitions the input voltage Vin among a plurality of components (e.g., series-connected resistors R1-R3 as shown in the figure) of the voltage divider. The mode-control signal Vm is provided, for example, from the node between the resistor R2 and the resistor R3.

In a normal mode, for example, when the input Vin of the EOS circuit is about 1.8V, the bias circuit 12 accordingly generates a low mode-control signal Vm to open the mode-control switch Sm. A feature of the invention can comprise the mode-control signal Vm being present in a way such that the mode-control switch is open in the normal mode. In the exemplary embodiment, the mode-control signal Vm may be a low voltage of about 0.6V in the normal mode. Due to high input impedance of the IC 10, the voltage drop across the series-connected resistors Ra-Rc is negligibly small.

In an EOS mode, for example, when the input Vin of the EOS circuit is about 10V, the bias circuit 12 accordingly generates a high mode-control signal Vm to close the mode-control switch Sm. A feature of the invention can comprise the mode-control signal Vm being present in a way such that the mode-control switch is closed in the EOS mode. In the exemplary embodiment, the mode-control signal Vm may be a high voltage of about 3.3V in the EOS mode. As a result, the output Vout is pulled to low potential. At the same time, a substantial portion of the EOS voltage may be approximately partitioned among the series-connected resistors Ra-Rc, such that the voltage drop across each resistor Ra, Rb or Rc may be below 3.3V to ensure that each resistor Ra, Rb or Rc is not pushed to failure or even damage. Generally speaking, the arrangement and/or number of the series-connected resistors is selected in a way such that the voltage drop across each resistor may be below a specified operating voltage (e.g., 3.3V in this example) in the EOS mode to ensure that each resistor does not undergo failure or damage. One or more of the resistors may be implemented with a resistor-configured MOS transistor.

Figure 1B:
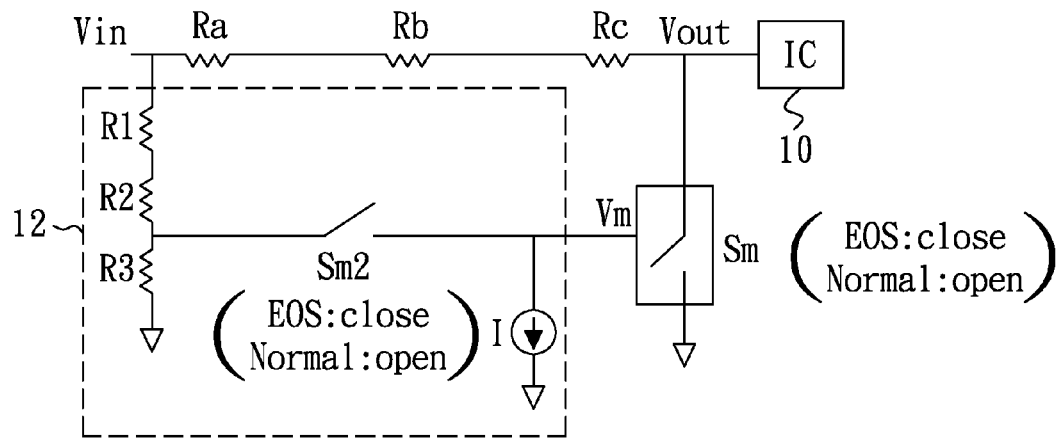
FIG. 1B shows a schematic of an EOS protection circuit for an electronic device according to an embodiment alternative to that shown in FIG. 1A.

FIG. 1B shows a schematic of an EOS protection circuit for an IC 10 according to an embodiment alternative to that shown in FIG. 1A. The present embodiment is similar in structure and operation to the previous embodiment of FIG. 1A with the exception of the bias circuit 12 further including a second mode-control switch Sm2. One end of the second mode-control switch Sm2 is coupled to the node between the resistor R2 and the resistor R3, with the other end providing the mode-control signal Vm and connection with a weak current source I. Specifically speaking, in the normal mode, the second mode-control switch Sm2 is open, with the mode-control signal Vm being pulled to low potential via the current source I to ensure that the mode-control switch Sm may be open. In other words, the second mode-control switch Sm2 may be utilized to prevent the mode-control switch Sm from being mistakenly closed in the normal mode.

Figure 2A:
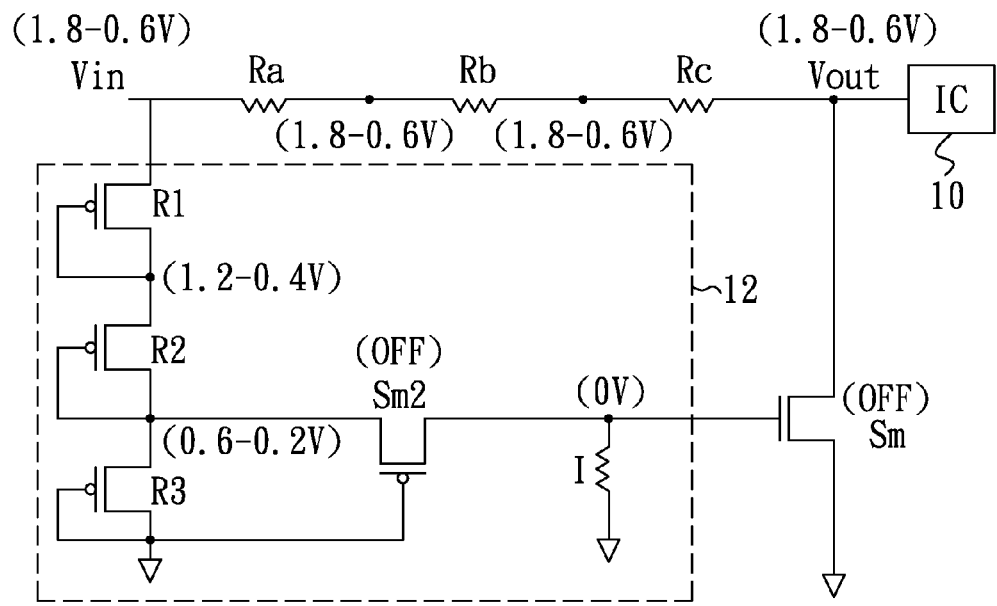
FIG. 2A and FIG. 2B show one exemplary implementation and associated parameters of FIG. 1B in the normal mode and the EOS mode respectively.
Figure 2B:
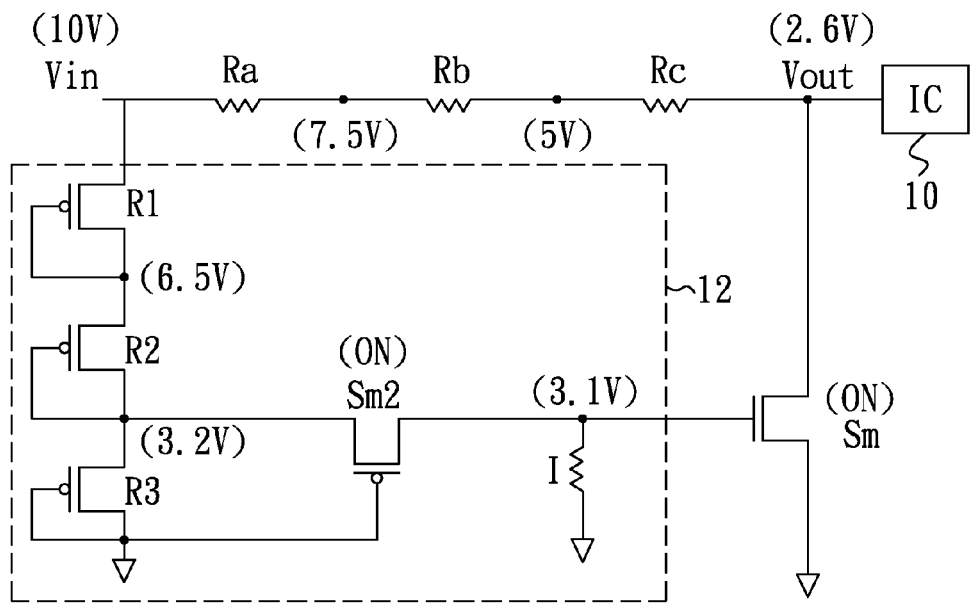

FIG. 2A and FIG. 2B show one exemplary implementation and associated parameters of FIG. 1B in the normal mode and the EOS mode respectively. Specifically, each of the series-connected resistors R1-R3 is implemented with a resistor-configured p-type metal-oxide-semiconductor (PMOS) transistor. For example, the resistor-configured PMOS transistor can be formed by shorting its gate and drain. The mode-control switch Sm is implemented with an n-type MOS (NMOS) transistor, the second mode-control switch Sm2 is implemented with a PMOS transistor, and the current source I is implemented with a resistor.

It is shown in FIG. 2A that, in the normal mode, the second mode-control switch Sm2 is shut off, and the gate of the mode-control switch Sm is pulled low, thereby shutting off the mode-control switch Sm. It is shown in FIG. 2B that, in the EOS mode, the second mode-control switch Sm2 is turned on, and the gate of the mode-control switch Sm receives a high voltage (e.g., 3.1V), thereby turning on the mode-control switch Sm.

Figure 3A:
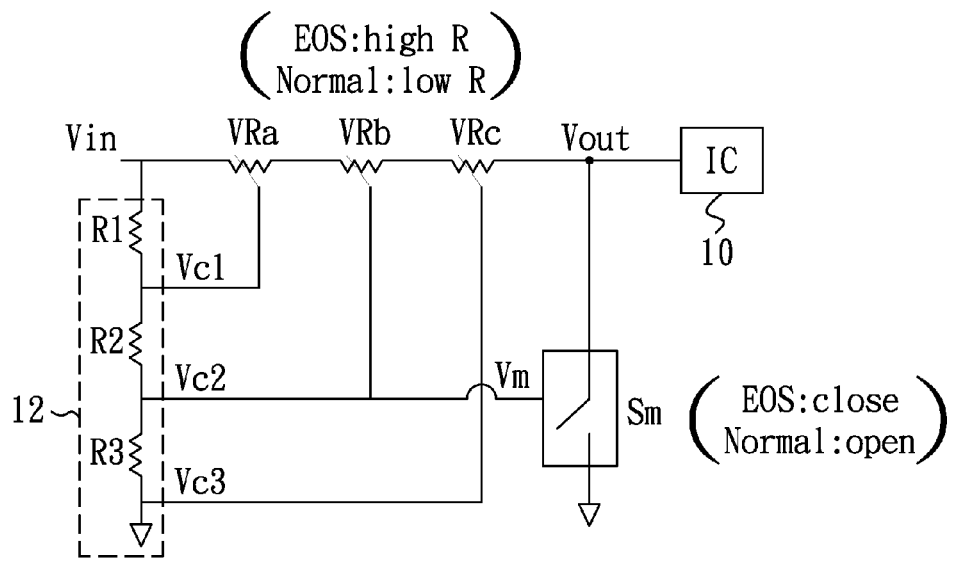
FIG. 3A shows a schematic of an EOS protection circuit for an electronic device according to a second embodiment of the present invention.

FIG. 3A shows a schematic of an EOS protection circuit for an IC 10 according to a second embodiment of the present invention. The present embodiment is similar in structure and operation to the embodiment of FIG. 1A except for the series-connected resistors Ra-Rc being replaced by series-connected voltage-controlled resistors VRa-VRc, such that the resistance becomes low in the normal mode and high in the EOS mode. The resistance of the voltage-controlled resistors VRa-VRc may be respectively controlled by control signals Vc1-Vc3 provided by the bias circuit 12. In an exemplary embodiment, the voltage-controlled resistor VRa is controlled under the control signal Vc1 that is provided from the node between the resistor R1 and the resistor R2; the voltage-controlled resistor VRb is controlled under the control signal Vc2 that is provided from the node between the resistor R2 and the resistor R3; and the voltage-controlled resistor VRc is controlled under the control signal Vc3 that is provided from the node between the resistor R3 and the ground. It is noted that, in the exemplary embodiment, the control signal Vc2 is the same as the mode-control signal Vm.

Figure 3B:
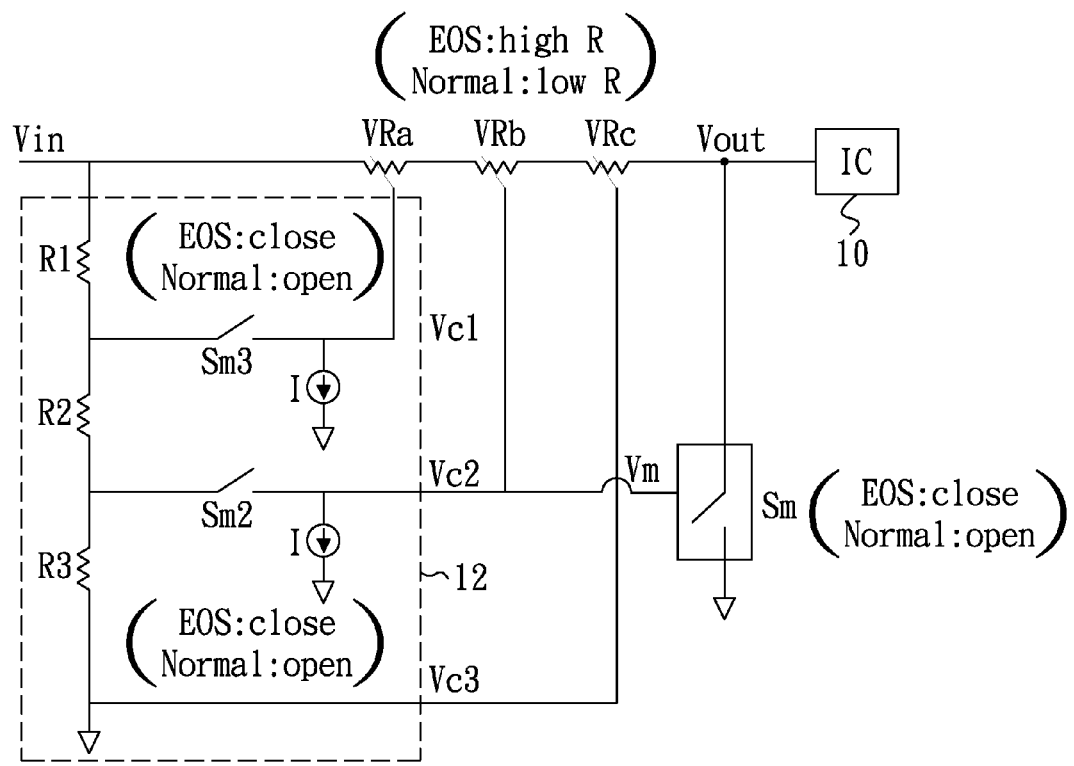
FIG. 3B shows a schematic of an EOS protection circuit for an electronic device according to an embodiment alternative to that depicted in FIG. 3A.

FIG. 3B shows a schematic of an EOS protection circuit for an IC 10 according to an embodiment alternative to that depicted in FIG. 3A. The present embodiment is similar in structure and operation to the embodiment of FIG. 3A with the exception of the bias circuit 12 further including a second mode-control switch Sm2 and a weak current source I configured similarly to the FIG. 1B arrangement. Furthermore, the bias circuit 12 includes a third mode-control switch (also called an extra mode-control switch) Sm3 with one end coupled to the node between the resistor R1 and the resistor R2 and the other end connected with a weak current source I.

In operation, the second mode-control switch Sm2 is open in the normal mode thereby pulling the control signal Vc2 to low level via the current source I and accordingly decreasing the resistance of the voltage-controlled resistor VRb, and the second mode-control switch Sm2 is closed in the EOS mode thereby pulling the control signal Vc2 to high level and accordingly increasing the resistance of the voltage-controlled resistor VRb. Similarly, the third mode-control switch Sm3 is open in the normal mode thereby pulling the control signal Vc1 to low level via the current source I and accordingly decreasing the resistance of the voltage-controlled resistor VRa, and the third mode-control switch Sm3 is closed in the EOS mode thereby pulling the control signal Vc1 to high level and accordingly increasing the resistance of the voltage-controlled resistor VRa.

Although specific embodiments have been illustrated and described, it will be appreciated by those skilled in the art that various modifications may be made without departing from the scope of the present invention, which is intended to be limited solely by the appended claims.

What is claimed is:

1. An electrical-overstress (EOS) protection circuit for an electronic device, comprising:
    series-connected voltage-controlled resistors electrically coupled between an input an and output;
    a mode-control switch electrically coupled between the output and a ground; and
    a bias circuit electrically coupled to the input with a configuration for generation of a mode-control signal to control the mode-control switch, and generating at least one control signal for controlling at least one of the voltage-controlled resistors;
    wherein, the mode-control signal and the control signal are present with the mode-control switch being open in a normal mode and closed in an (EOS) mode, and the resistance of the voltage-controlled resistors is higher in the (EOS) mode than in the normal mode.

2. The (EOS) protection circuit of claim 1, wherein the series-connected voltage-controlled resistors are arranged and numbered in a way such that voltage drop across each said resistor in the EOS mode is below a specified operating voltage.

3. The EOS protection circuit of claim 1, wherein the bias circuit comprises a voltage divider configured to partition the input voltage among a plurality of components, and wherein the mode-control signal and the control signal are derived from respective nodes among the components.

4. The EOS protection circuit of claim 3, wherein the components are resistor components.

5. The EOS protection circuit of claim 4, wherein each resistor component is a resistor-configured MOS transistor.

6. The EOS protection circuit of claim 1, further comprising at least one extra mode-control switch with one end coupled to the bias circuit and another end providing the control signal and being connected with a current source, and wherein the extra mode-control switch is open in the normal mode and closed in the EOS mode.

7. The EOS protection circuit of claim 1, wherein the bias circuit is arranged to generate the mode-control signal and the control signal in a way such that the mode-control switch is open in the normal mode and is closed in the (EOS) mode.

* * * * *